D. W. Hughes.
Plow.

№ 73607          Patented Jan. 21, 1868

Witnesses.
W. C. Ashkettle
Theo Tuschl

Inventor.
D. W. Hughes.
per Munn & Co
Attorneys.

United States Patent Office.

DAVID W. HUGHES, OF QUINCY, ILLINOIS.

Letters Patent No. 73,607, dated January 21, 1868.

---

IMPROVEMENT IN PLOUGHS.

---

The Schedule referred to in these Letters Patent and making part of the same.

---

TO ALL WHOM IT MAY CONCERN:

Be it known that I, DAVID W. HUGHES, of Quincy, in the county of Adams, and State of Illinois, have invented a new and improved Plough; and I do hereby declare that the following is a full, clear, and exact description thereof, which will enable those skilled in the art to make and use the same, reference being had to the accompanying drawings, forming part of this specification.

This invention is designed to reduce friction and consequently diminish draught in ploughs, and to this end it consists in dispensing with the ordinary land-side, and substituting therefor a supplemental share, which is placed at the rear of the front plough, and has a reverse angular position to the latter, so that the lateral pressure exerted against one share in one direction will compensate for that exerted against the other in an opposite direction. The invention further consists in placing the ploughs at the outer side of the wheels, so that both the latter will travel over unploughed ground. In the accompanying sheet of drawings—

Figure 1:
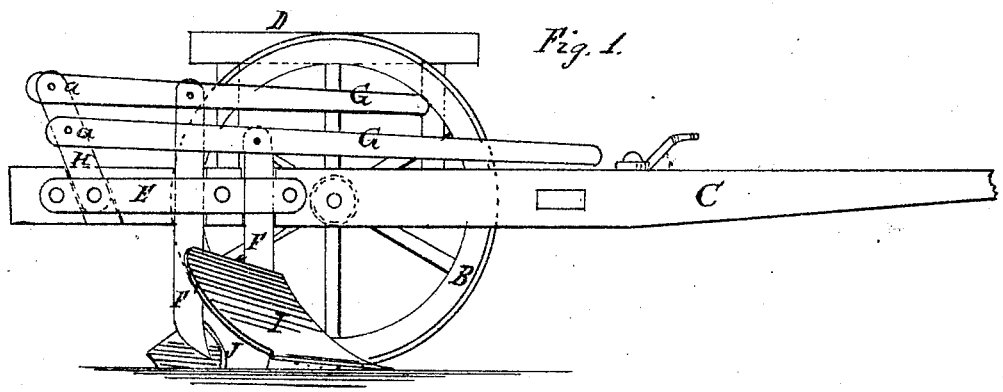

Figure 1 is a side view of my invention.

Figure 2:
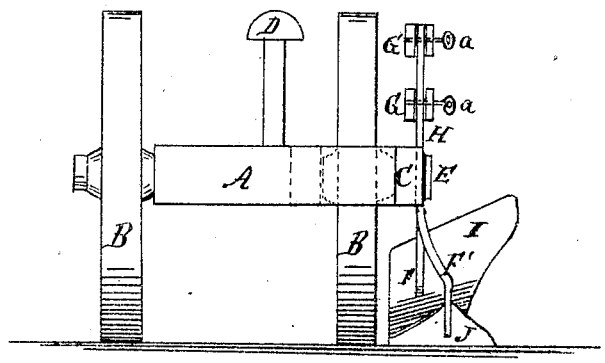

Figure 2 a rear view of the same.

Similar letters of reference indicate corresponding parts.

A represents a truck or frame, B B the wheels thereof, and C the beam and draught-pole. D is the driver's seat on the frame A. On the outer side of the beam C there is screwed or bolted a plate, E, formed to serve as sockets for two plough-standards F F'. These standards are allowed to slide freely up and down and are attached at their upper ends to levers G G', which are secured by fulcrum-pins $a$ to a plate, H, attached to the beam, the levers G G' being within convenient reach of the driver on seat D. To the lower end of the front standard F there is attached a plough, I, which is constructed simply of a mould-board and share, the mould-board having an oblique angle to throw the earth to the right as the plough is drawn along. To the lower end of the rear standard F' there is attached a plough or share, J, having an angle reverse to that of plough I. This share J is designed to work below the plough I, and serve to lighten up the sub-soil, without throwing any portion up over the furrow-slice turned by the plough I.

It will be seen that the reverse angular position of the plough I and share J will prevent any lateral movement of the implement as it is drawn along, the ploughs always remaining in the direct line of draught as the lateral pressure against one plough is counteracted by that against the other. Having the ploughs at the outer side of the wheels admits of the latter travelling over unploughed ground, which is of great advantage, admitting of square corners being made in turning at the ends of lands, without raising the ploughs out of the ground.

I claim as new, and desire to secure by Letters Patent—

1. The placing of the ploughs at the outer sides of the wheels B B, substantially in the manner as and for the purpose set forth.

2. Having the ploughs or shares I J placed in reverse oblique positions for the purpose of dispensing with a land-side, to avoid friction and draught, and to keep the implement in line with the line of draught, as set forth.

DAVID W. HUGHES.

Witnesses:
ASA W. BLAKESLEY.
WM. M. BIRD.